(12) United States Patent
Choi et al.

(10) Patent No.: US 10,349,228 B2
(45) Date of Patent: Jul. 9, 2019

(54) METHOD FOR MULTICAST TRANSMISSION BASED ON ASYNCHRONOUS REQUEST IN WIRELESS COMMUNICATION SYSTEM AND APPARATUS FOR THE SAME

(71) Applicant: LG ELECTRONICS INC., Seoul (KR)

(72) Inventors: Wan Choi, Seoul (KR); Bi Hong, Seoul (KR); Kyungrak Son, Seoul (KR); Dongin Kim, Seoul (KR); Hanbyul Seo, Seoul (KR)

(73) Assignees: LG Electronics Inc., Seoul (KR); Research Business Foundation Sungkyunkwan Univ., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/678,886

(22) Filed: Aug. 16, 2017

(65) Prior Publication Data
US 2018/0054715 A1    Feb. 22, 2018

Related U.S. Application Data

(60) Provisional application No. 62/375,457, filed on Aug. 16, 2016.

(51) Int. Cl.
*H04L 12/28* (2006.01)
*H04W 4/06* (2009.01)
*H04W 72/00* (2009.01)
*H04L 12/18* (2006.01)

(52) U.S. Cl.
CPC .......... *H04W 4/06* (2013.01); *H04W 72/005* (2013.01); *H04L 12/189* (2013.01)

(58) Field of Classification Search
CPC ...... H04W 4/06; H04W 72/005; H04L 12/189
See application file for complete search history.

(56) References Cited

U.S. PATENT DOCUMENTS

| | | | | |
|---|---|---|---|---|
| 6,771,642 B1* | 8/2004 | Seaver | ................... | H04L 49/201 370/229 |
| 2007/0189290 A1* | 8/2007 | Bauer | ................. | H04L 12/1836 370/390 |
| 2014/0355493 A1* | 12/2014 | Niu | ....................... | H04W 76/40 370/280 |

(Continued)

*Primary Examiner* — Clemence S Han
(74) *Attorney, Agent, or Firm* — Dentons US LLP

(57) ABSTRACT

A method for transmitting downlink data from a BS in a wireless communication system is disclosed. The method comprises receiving a first request signal of the downlink data from a first UE at a first timing point; transmitting packet of the downlink data to the first UE by using a unicast scheme until a multicast preparation time period passes from the first timing point; receiving a second request signal of the downlink data from a second UE at a second timing point after the first timing point; transmitting packet of the downlink data to the second UE by using the unicast scheme until the multicast preparation time period passes from the second timing point; and transmitting packet of the downlink data to a multicast group, which includes the first UE and the second UE, by using a multicast scheme when the multicast preparation time period passes.

8 Claims, 4 Drawing Sheets

(56) References Cited

U.S. PATENT DOCUMENTS

| | | | | |
|---|---|---|---|---|
| 2016/0119395 A1* | 4/2016 | Li | ................... | H04L 12/189 |
| | | | | 709/219 |
| 2016/0360383 A1* | 12/2016 | Morita | ................... | H04W 4/06 |
| 2017/0289990 A1* | 10/2017 | Kaushik | ................... | H04L 43/16 |
| 2017/0295029 A1* | 10/2017 | Li | ................... | H04W 56/00 |
| 2018/0115403 A1* | 4/2018 | Sakai | ................... | H04W 4/06 |

* cited by examiner

METHOD FOR MULTICAST TRANSMISSION BASED ON ASYNCHRONOUS REQUEST IN WIRELESS COMMUNICATION SYSTEM AND APPARATUS FOR THE SAME

CROSS-REFERENCE TO RELATED APPLICATIONS

Pursuant to 35 U.S.C. 119(e), this application claims the benefit of earlier filing date and right of priority to U.S. Provisional Application No. 62/375,457, filed on Aug. 16, 2017, the contents of which are hereby incorporated by reference herein in their entirety.

BACKGROUND OF THE INVENTION

Field of the Invention

The present invention relates to a wireless communication system, and more particularly, to a method for multicast transmission based on an asynchronous request in a wireless communication system and an apparatus for the same.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP.E-UMTS may be generally referred to as an LTE system. For details of the technical specifications of UMTS and E-UMTS, reference can be made to Release 7 and Release 8 of 3rd Generation Partnership Project; Technical Specification Group Radio Access Network.

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Based on the aforementioned discussion, an object of the present invention is to provide a method for multicast transmission based on an asynchronous request in a wireless communication system and an apparatus for the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

In one aspect of the present invention, a method for transmitting downlink data from a BS in a wireless communication system comprises receiving a first request signal of the downlink data from a first UE at a first timing point; transmitting packet of the downlink data to the first UE by using a unicast scheme until a multicast preparation time period passes from the first timing point; receiving a second request signal of the downlink data from a second UE at a second timing point after the first timing point; transmitting packet of the downlink data to the second UE by using the unicast scheme until the multicast preparation time period passes from the second timing point; and transmitting packet of the downlink data to a multicast group, which includes the first UE and the second UE, by using a multicast scheme when the multicast preparation time period passes.

In another aspect of the present invention, a BS in a wireless communication system, the BS comprises a radio frequency (RF) module; and a processor connected with the RF module, wherein the processor receives a first request signal of the downlink data from a first UE at a first timing point, transmits packet of the downlink data to the first UE by using a unicast scheme until a multicast preparation time period passes from the first timing point, receives a second request signal of the downlink data from a second UE at a second timing point after the first timing point, and transmits packet of the downlink data to the second UE by using the unicast scheme until the multicast preparation time period passes from the second timing point, and wherein the processor transmits packet of the downlink data to a multicast group, which includes the first UE and the second UE, by using a multicast scheme when the multicast preparation time period passes.

Preferably, when the downlink data are transmitted using the multicast scheme, next packets of the packet transmitted to the second UE using the unicast scheme are transmitted using the multicast scheme.

More preferably, the number of the downlink data received by the second UE using the unicast scheme is smaller than the number of packets of the downlink data received by the first UE using the unicast scheme.

Additionally, the packets of the downlink data transmitted using the multicast scheme include information indicating whether the packets are those previously transmitted using the unicast scheme.

Moreover, a communication resource used in the multicast scheme is a sum of a communication resource to the first UE, which is used using the unicast scheme, and a communication resource to the second UE, which is used in the unicast scheme.

According to the embodiment of the present invention, it is expected that a transmission time may be reduced as compared with the mobile communication system of the related art. Such reduction of the transmission time enables fast restoration of communication resources consumed in the overall system, whereby it is also expected that usage efficiency of the overall communication resources may be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.
In the drawings.

DETAILED DESCRIPTION OF THE PREFERRED EMBODIMENTS

Hereinafter, structures, operations, and other features of the present invention will be readily understood from the embodiments of the present invention, examples of which are illustrated in the accompanying drawings. Embodiments which will be described herein below are examples in which technical features of the present invention are applied to a 3GPP system.

In the present disclosure, a base station (eNB) may be used as a broad meaning including a remote radio head (RRH), an eNB, a transmission point (TP), a reception point (RP), a relay, etc.

The present invention aims to suggest a method for reducing a transmission time noticed by a UE through multicast transmission of data such as video, which is asynchronously required by the UE.

A conventional multicast transmission scheme simultaneously transmits one kind of data to several UEs, and is restrictive for data required simultaneously, that is, asynchronously, by several UEs. However, in the present invention, a method for grouping several UEs in response to an asynchronous request of same data to generate a multicast group is used. As a result, an average transmission time may be reduced to assist efficient usage of resources in an overall communication system.

In more detail, in the wireless communication system of the related art, even though several UEs request the same file, if the same file is required at different timings the same file is regarded as different data due to a difference in asynchronous transmission timing and then transmitted. That is, if the same data is requested at different timings, transmission of a BS in response to the request may be referred to as unicast transmission. Therefore, according to the unicast transmission, the BS performs scheduling for allocating communication resources such as frequency and time in accordance with a certain method with respect to a request of UEs and receives data required through a communication resource allocated by scheduling of the UEs.

Also, unicast transmission in the wireless communication system of the related art has restriction that communication resources should be orthogonal in accordance with the number of UEs. For this reason, if the number of UEs is increased, communication throughput is seriously deteriorated, and a usage amount of a backbone network is increased proportionally. Although the related art considers multicast transmission in the mobile communication system, the multicast transmission is restrictively used for only a case such as live broadcasting, in which data requests are at the same time. Therefore, the multicast transmission of the related art has a limitation in its application range if the multicast transmission of the related art is different from an actual file request pattern of UEs in the mobile communication system.

Figure 1:
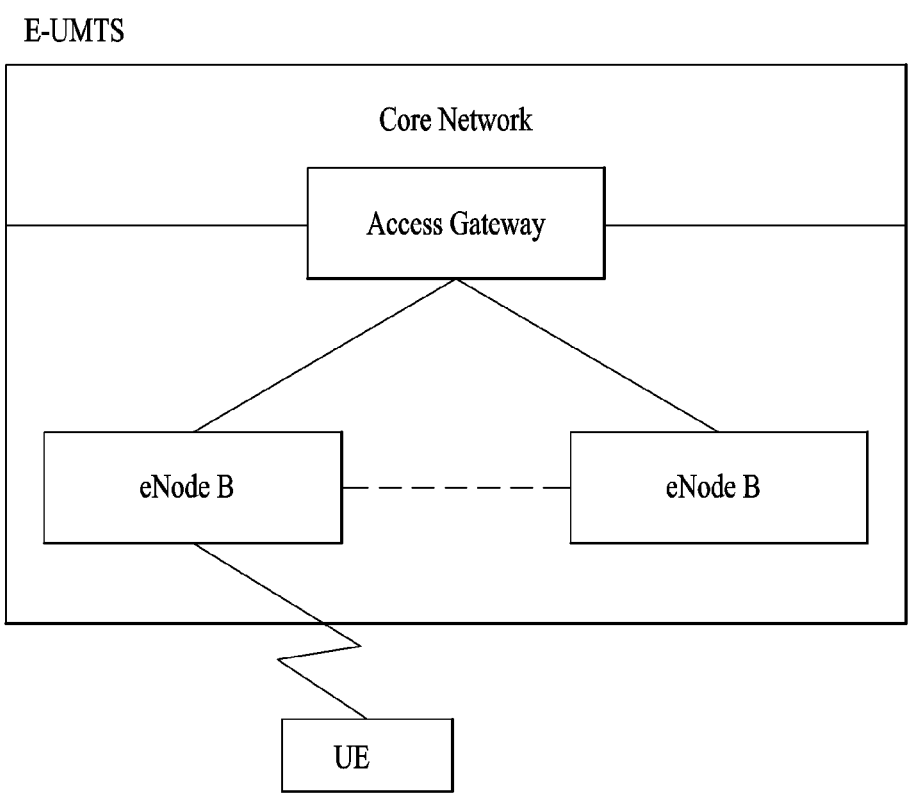
FIG. 1 is a diagram schematically illustrating a network structure of an E-UMTS as an exemplary radio communication system.
Figure 2:
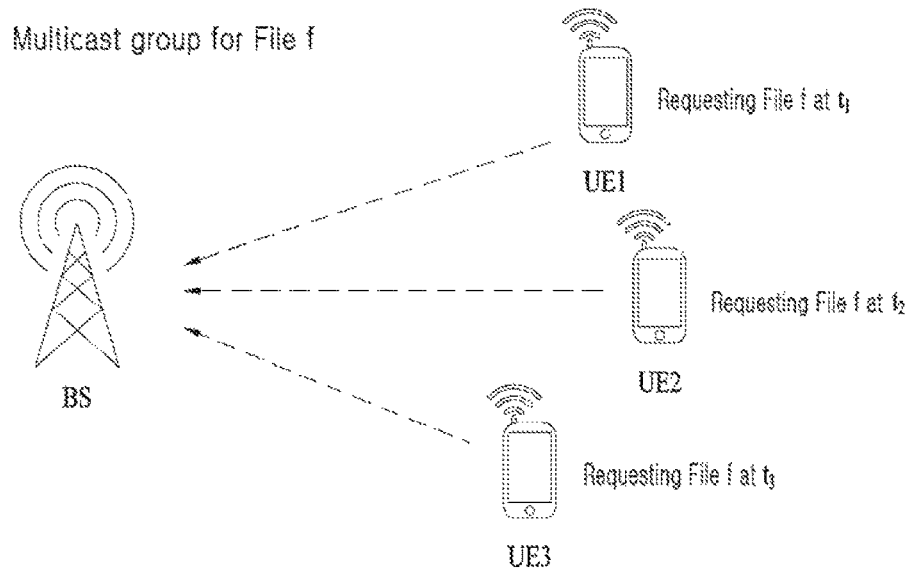
FIG. 2 is a diagram illustrating an example of a wireless communication system that includes a base station and a user equipment, to which the present invention is applied.

FIG. 2 is a diagram illustrating an example of a wireless communication system that includes a base station and a user equipment, to which the present invention is applied;

Referring to FIG. 2, a downlink communication scheme operates in an environment that one BS and several UEs exist. A UE receives a service from the BS through a certain communication resource in the same manner as the existing wireless communication system. In this case, the communication resource of each UE will be defined as $W_b$ for convenience. The downlink communication is performed in a unit of a certain packet, and if the UE does not receive data normally, the BS retransmits the packet by using a retransmission mechanism such as H-ARQ until transmission is normally performed.

Figure 3:
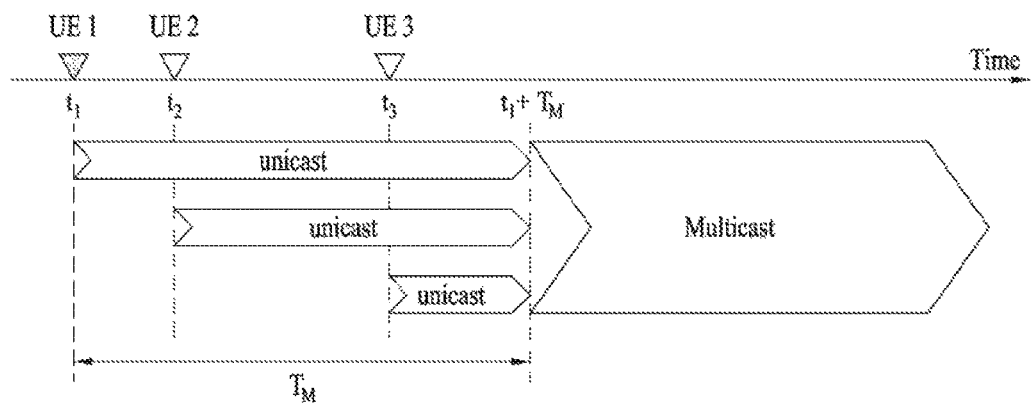
FIG. 3 is a diagram illustrating an example of forming a multicast group and performing multicast transmission in accordance with the embodiment of the present invention.

Under the circumstances, in the present invention, multicast transmission is performed as shown in FIG. 3. FIG. 3 is a diagram illustrating an example of forming a multicast group and performing multicast transmission in accordance with the embodiment of the present invention. Also, FIG. 4 is a diagram illustrating a packet structure during multicast transmission according to the embodiment of the present invention.

Figure 4:
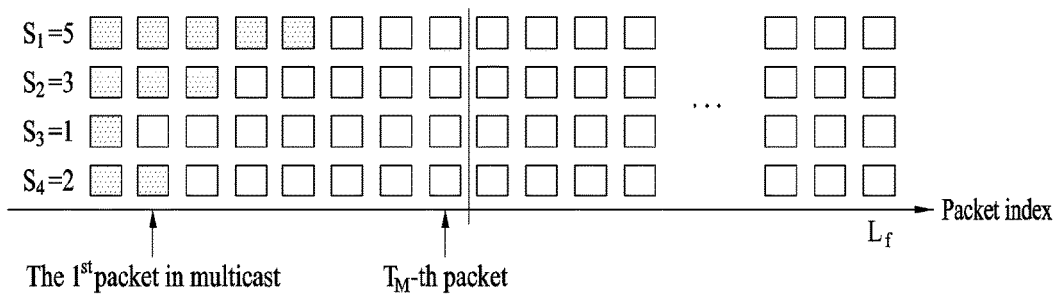
FIG. 4 is a diagram illustrating a packet structure during multicast transmission according to the embodiment of the present invention.

Referring to FIGS. 3 and 4, first of all, a multicast group is formed. In more detail, if there is no group seeder at the time when a UE which requires a specific file f comprised of $L_f$ packets starts to receive the file from a BS, the corresponding UE becomes a group seeder. Afterwards, the group seeder waits for a group member which requires the same file f for a time period $T_M$. This time period is referred to as a multicast preparation time period. On the other hand, if there is already a group seeder at the time when the UE which requires the file f receives the file and a time within $T_M$ passes from the time when the group seeder is received, the corresponding UE becomes the group member.

UEs which belong to the multicast group sequentially receive packets of a file by using their respective resources $W_b$ for the multicast preparation time period ($T_M$ from the time when the group seeder is received). For example, as shown in FIG. 3, UE1 automatically becomes the group seeder because there are no other UEs at the time $t_1$ when the file f is required, and UE2 and UE3, which require the same file f between $t_1$ and $t_1+T_M$, become the group members. The UEs which require the same file f occur in accordance with probability distribution such as Poisson distribution, and throughput in the present invention is obtained in a state that Poisson distribution having an arrival rate of $\lambda_f$ is assumed. If there is a group of a total of K UEs, the number of packets received by each UE for the multicast preparation time period is defined as $s_1, s_2, \ldots, s_K$.

After the multicast preparation time period ends, multicast transmission of the BS starts. The multicast transmission is performed from the $(\min\{s_1, s_2, \ldots, s_K\}+1)$th packet of the file f. Also, the multicast transmission is performed by grouping resources of UEs which belong to the multicast group. That is, if there is a group of a total of K UEs, the transmission is performed using resources of $KW_b$. The transmission is performed until transmission of the packets is completed through retransmission in the same manner as transmission of the multicast preparation time period.

Referring to FIG. 4, if there is a multicast group comprised of a total of 4 UEs (K=4), the BS performs multicast transmission from the second packet because $s_3=1$ has the smallest storage amount. In case of a retransmission condition, retransmission of the second packet occurs based on the reception state of UE3. This is because that the other UEs except UE3 have already received the second packet. However, information as to retransmitted packet may be required to be indicated using flag information of a header of the corresponding packet. In this case, UE1, UE2 and UE4 may recognize that the corresponding packet is retransmitted due to UE3.

Likewise, retransmission of the third packet occurs based on the reception state of UE3 and UE4, and retransmission of the fourth and fifth packets occurs based on the reception state of UE2 to UE4. Retransmission of subsequent packets occurs based on the reception state of all of UE1 to UE4, which belong to the multicast group. The packets of the file are sequentially transmitted, and transmission of all UEs of the multicast group ends at the same time.

Figure 5:
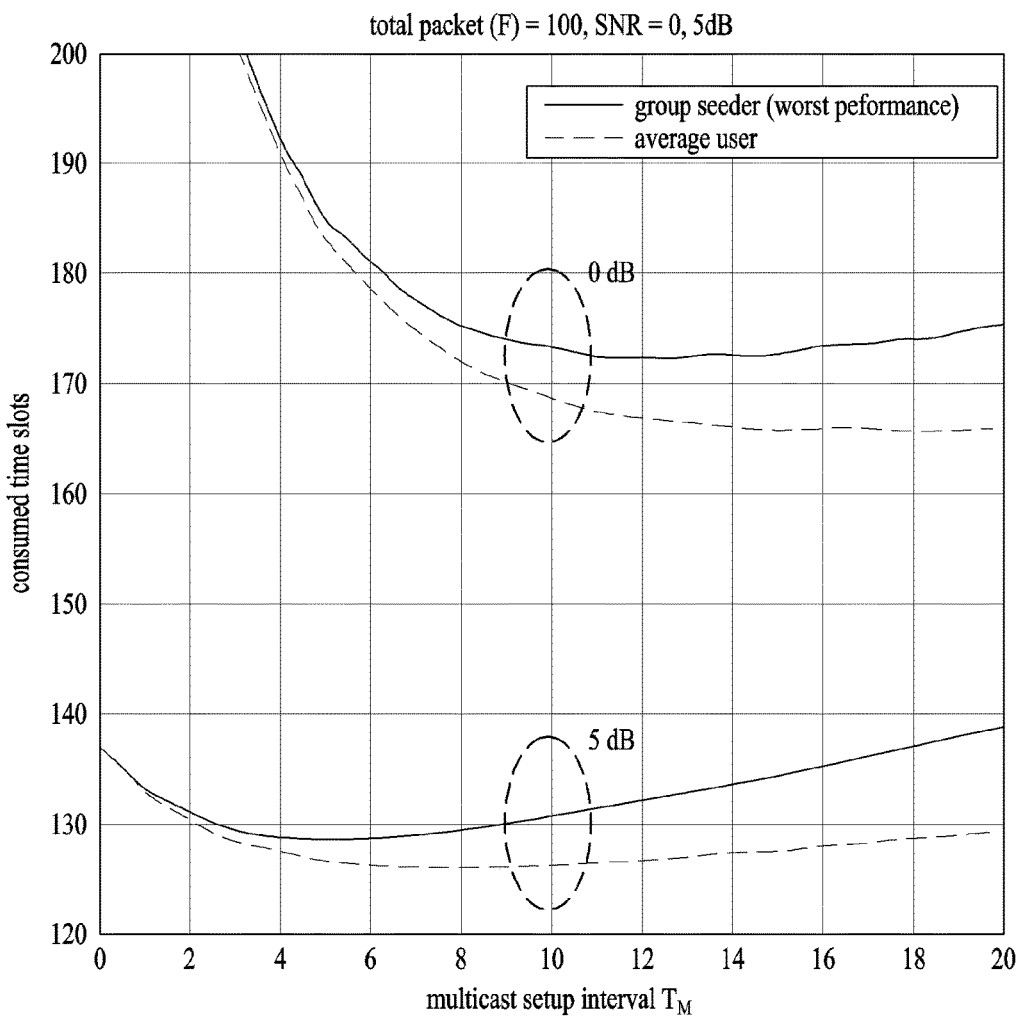
FIG. 5 is a diagram illustrating a throughput result of an effect of multicast transmission of the present invention according to an optimal multicast preparation time period.

According to the present invention, it is expected that a transmission time may be reduced as compared with the mobile communication system of the related art. FIG. 5 is a diagram illustrating a throughput result of an effect of multicast transmission of the present invention according to an optimal multicast preparation time period.

Referring to FIG. 5, it is noted that the transmission time is reduced through setup of $T_M$ of a proper value. Particularly, FIG. 5 shows a transmission time when a total of 100 packets are transmitted using outage probability of packet. In more detail, it is noted that a transmission time is remarkably reduced as compared with the communication scheme ($T_M=0$) of the related art when SNR (Signal to Noise Ratio) is set to $T_M \geq 10$ at 0 dB. Also, such reduction of the transmission time enables fast restoration of communication resources consumed in the overall system, whereby it is expected that usage efficiency of the overall communication resources may be improved.

Figure 6:
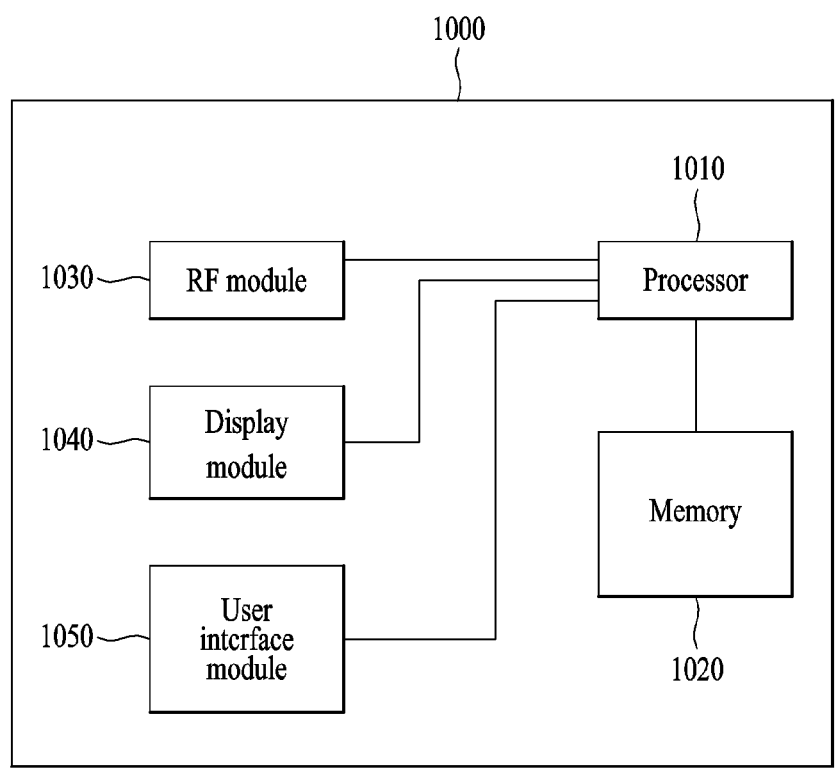
FIG. 6 is a block diagram of a communication apparatus according to an embodiment of the present invention.

FIG. 6 is a block diagram of a communication apparatus according to an embodiment of the present invention.

Referring to FIG. 6, the communication device 1000 includes a processor 1010, a memory 1020, an RF module 1030, a display module 1040, and a user interface module 1050.

The communication device 1000 is illustrated for convenience of description and some modules may not be omitted. The communication device 1000 may further include necessary modules. In addition, some modules of the communication device 1000 may be subdivided. The processor 1010 is configured to perform operations according to the embodiment of the present invention that is exemplified with reference to the diagrams. In detail, a detailed operation of the processor 1010 would be understood with reference to FIGS. 1 to 9.

The memory 102 is connected to the processor 101 and stores an operating system, an application, a program code, data, etc. The RF module 103 is connected to the processor 101 and converts a baseband signal into a radio signal or converts a radio signal into a baseband signal. To this end, the RF module 103 performs analog conversion, amplification, filtering, and frequency up-conversion, or inverse procedures thereof. The display module 104 is connected to the processor 101 and displays various pieces of information. The display module 104 may use, but is not limited to, well-known elements such as a liquid crystal display (LCD), a light emitting diode (LED), and an organic light emitting diode (OLED). The user interface module 105 may be connected to the processor 101 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting downlink data from a Base Station (BS) in a wireless communication system, the method comprising:
receiving a first request signal for the downlink data from a first User Equipment (UE);
transmitting the downlink data to the first UE in response to the first request signal based on a unicast scheme, to a multicast preparation time;
receiving a second request signal of the downlink data from a second UE after receiving the first request signal;
transmitting the downlink data to the second UE in response to the second request signal based on the unicast scheme, to the multicast preparation time; and
transmitting the downlink data to a multicast group, which includes the first UE and the second UE, based on a multicast scheme after the multicast preparation time,
wherein communication resources for the multicast group are a sum of communication resources from each of the first UE and the second UE communicating based on the unicast scheme.

2. The method according to claim 1, wherein the step of transmitting the downlink data to the multicast group based on the multicast scheme includes transmitting packets of the downlink data, which follow packets of the downlink data previously transmitted to the second UE based on the unicast scheme, to the multicast group based on the multicast scheme.

3. The method according to claim 2, wherein a number of packets of the downlink data received by the second UE based on the unicast scheme is smaller than the number of packets of the downlink data received by the first UE based on the unicast scheme.

4. The method according to claim 1, wherein packets of the downlink data transmitted to the multicast group based on the multicast scheme include information related to whether the packets were previously transmitted based on the unicast scheme.

5. A Base Station (BS) in a wireless communication system, the BS comprising:
a receiver and transmitter; and
a processor, operatively coupled to the receiver and transmitter, wherein the processor is configured to:
control the receiver to receive a first request signal of the downlink data from a first User Equipment (UE);
control the transmitter to transmit the downlink data to the first UE in response to the first request signal based on a unicast scheme, to a multicast preparation time;
control the receiver to receive a second request signal for the downlink data from a second UE after receiving the first request signal;
control the transmitter to transmit the downlink data to the second UE in response to the second request signal based on the unicast scheme, to the multicast preparation time; and
control the transmitter to transmit the downlink data to a multicast group, which includes the first UE and the second UE, based on a multicast scheme after the multicast preparation time, and
wherein communication resources for the multicast group are a sum of communication resources from each of the first UE and the second UE communicating based on the unicast scheme.

6. The BS according to claim 5, wherein the processor is further configured to control the transmitter to transmit packets of the downlink data, which follow packets of the downlink data previously transmitted to the second UE based on the unicast scheme, to the multicast group based on the multicast scheme.

7. The BS according to claim 6, wherein a number of packets of the downlink data received by the second UE based on the unicast scheme is smaller than the number of packets of the downlink data received by the first UE based on the unicast scheme.

8. The BS according to claim 5, wherein packets of the downlink data transmitted to the multicast group based on the multicast scheme include information related to whether the packets were previously transmitted based on the unicast scheme.

* * * * *